United States Patent
Heresztyn et al.

(10) Patent No.: US 9,285,278 B2
(45) Date of Patent: Mar. 15, 2016

(54) SYSTEM AND METHODS FOR THERMAL CONTROL USING SENSORS ON DIE

(71) Applicant: Apple Inc., Cupertino, CA (US)

(72) Inventors: Amaury J. Heresztyn, Cupertino, CA (US); Ihtesham H. Chowdhury, Sunnyvale, CA (US); Keith Cox, Campbell, CA (US)

(73) Assignee: Apple Inc., Cupertino, CA (US)

( * ) Notice: Subject to any disclaimer, the term of this patent is extended or adjusted under 35 U.S.C. 154(b) by 254 days.

(21) Appl. No.: 13/891,030

(22) Filed: May 9, 2013

(65) Prior Publication Data

US 2014/0334107 A1 Nov. 13, 2014

(51) Int. Cl.
*G01K 1/00* (2006.01)
*G01K 7/01* (2006.01)

(52) U.S. Cl.
CPC .......................................... *G01K 7/01* (2013.01)

(58) Field of Classification Search
USPC ............. 374/1, 110, 112, 166, 137, 115, 152, 374/25, 29, 134
See application file for complete search history.

(56) References Cited

U.S. PATENT DOCUMENTS

| | | | |
|---|---|---|---|
| 6,058,012 A * | 5/2000 | Cooper et al. ................. | 361/704 |
| 6,678,877 B1 * | 1/2004 | Perry et al. ..................... | 361/720 |
| 6,847,010 B1 * | 1/2005 | Hsieh et al. .................... | 219/209 |
| 7,518,493 B2 | 4/2009 | Bryzek et al. | |
| 7,590,473 B2 | 9/2009 | Wyatt | |
| 7,680,622 B2 * | 3/2010 | Dupuy et al. ................. | 702/132 |
| 7,707,525 B2 * | 4/2010 | Varon-Weinryb .. | G06F 17/5018 716/136 |
| 8,031,003 B2 | 10/2011 | Dishop | |
| 8,120,438 B2 | 2/2012 | Kishi | |
| 8,472,274 B2 | 6/2013 | Fai et al. | |
| 8,593,828 B2 * | 11/2013 | Blackwell et al. ............. | 361/810 |
| 2003/0055526 A1 | 3/2003 | Avanzino et al. | |
| 2004/0052512 A1 | 3/2004 | Aderhold et al. | |
| 2006/0013281 A1 * | 1/2006 | Sri-Jayantha et al. ........ | 374/163 |
| 2008/0002757 A1 | 1/2008 | Kosta et al. | |
| 2010/0290188 A1 * | 11/2010 | Brunschwiler et al. ....... | 361/699 |
| 2012/0019274 A1 | 1/2012 | Kinsley | |
| 2012/0163413 A1 | 6/2012 | Kim et al. | |
| 2012/0209448 A1 * | 8/2012 | Brower ......................... | 700/299 |

(Continued)

FOREIGN PATENT DOCUMENTS

TW 201306032 2/2013

OTHER PUBLICATIONS

International Search Report and Written Opinion mailed Aug. 18, 2014 in PCT/US2014/035087.

(Continued)

*Primary Examiner* — Mirellys Jagan
(74) *Attorney, Agent, or Firm* — Downey Brand LLP (57) ABSTRACT

A portable electronic device including a temperature sensor embedded in a die is provided. To process temperature measurements the portable electronic device includes a processor circuit coupled to the temperature sensor, the processor circuit configured to read a measurement from the temperature sensor when an integrated circuit in the die is inactive. Furthermore, a memory circuit coupled to the processor circuit and the temperature sensor stores a temperature gradient provided by the temperature sensor. A Printed Circuit Board for use in a portable electronic device as above is also provided. A method for performing thermal control in a portable electronic device as above is also provided.

12 Claims, 6 Drawing Sheets

(56) References Cited

U.S. PATENT DOCUMENTS

2012/0249218 A1   10/2012  Shoemaker
2013/0286595 A1*  10/2013  Lisk et al. .................... 361/719
2013/0322488 A1*  12/2013  Yazami et al. ............... 374/142
2014/0140364 A1*  5/2014  Charles et al. .................. 374/1
2014/0168903 A1*  6/2014  Clay ............................ 361/720

OTHER PUBLICATIONS

Taiwan Patent Application No. 103116427—Office Action dated Jun. 18, 2015.

* cited by examiner

SYSTEM AND METHODS FOR THERMAL CONTROL USING SENSORS ON DIE

FIELD OF THE DESCRIBED EMBODIMENTS

The described embodiments relate generally to methods, devices, and systems for thermal control in portable electronic devices. More particularly, embodiments disclosed herein relate to thermal control in portable electronic devices using sensors formed in a circuit die included in a Printed Circuit Board (PCB).

BACKGROUND

In the field of portable electronic devices, it is important to control device temperature on a real time basis. For that purpose, it is customary to include a thermistor or some other temperature sensor in a sensitive area of a printed circuit board (PCB). Continuous monitoring of the temperature sensor thus provides an accurate value of the PCB temperature in different points of the circuit. The downside of such approaches is the excess space ('real estate') used by the temperature sensor in the PCB layout. Concern for the usage and optimization of real estate in PCB circuitry for portable electronic devices is a major drive for design innovation and optimization. On the other hand, as portable electronic devices broaden their range of applicability and capabilities, there is an increased redundancy of circuitry in the PCB layout of such devices. As a result, for a standard portable electronic device there is typically a number of idle circuits in the PCB layout.

Therefore, what is desired is a method and a system for real time temperature monitoring in a portable electronic device without increasing a demand for real state in the PCB layout. What is also desired is an efficient use of circuitry already existing in a PCB layout for real time temperature monitoring.

SUMMARY OF THE DESCRIBED EMBODIMENTS

In a first embodiment, a portable electronic device is provided, the portable electronic device including a printed circuit board (PCB) and a die including an integrated circuit (IC), the die embedded in the PCB. The portable electronic device may further include a temperature sensor embedded in the die. To process temperature measurements the portable electronic device includes a processor circuit coupled to the temperature sensor, the processor circuit configured to read a measurement from the temperature sensor. Furthermore, a memory circuit coupled to the processor circuit and the temperature sensor stores a temperature gradient provided by the temperature sensor.

In a second embodiment, a Printed Circuit Board (PCB) for use in a portable electronic device is provided. The PCB includes a die having an integrated circuit (IC) and embedded in the PCB. A temperature sensor included in the die is configured to collect temperature measurements, and a processor circuit coupled to the temperature sensor reads a measurement from the temperature sensor and calculates a temperature gradient. A memory circuit coupled to the processor circuit and the temperature sensor stores a temperature gradient provided by the temperature sensor.

In a third embodiment, a method for performing thermal control in a portable electronic device, the method includes simulating a temperature gradient of an area of interest in a Printed Circuit Board (PCB); selecting a temperature sensor; collecting the temperature sensor reading; obtaining a measurement of the temperature gradient of the area of interest; and performing a remedial action in the area of interest.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings. These drawings do not limit any changes in form and detail that may be made to the described embodiments. Any such changes do not depart from the spirit and scope of the described embodiments.

In the figures, elements referred to with the same or similar reference numerals include the same or similar structure, use, or procedure, as described in the first instance of occurrence of the reference numeral.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Typical configurations for thermal control of a portable electronic device may use one thermistor circuit embedded in the printed circuit board (PCB). The signal from such thermistor circuit provides an indication of the overall temperature of the electronic device and is used as part of the thermal control around the unit. To provide a more accurate temperature value, it is desirable that the temperature sensor be placed at a distance from an thermal component. Indeed, thermal components may intermittently draw large amounts of power, heating up and cooling down through cycles that may not be indicative of an overall device temperature. Some of these thermal components may include power amplifiers (PA) for radio-frequency (RF) antennas. On the other hand, there may be natural hot spots in an electronic device where it is desirable to have a temperature sensor nearby. Such a natural hot spot may be a battery in a portable electronic device, or a radio-frequency (RF) processing circuit.

Temperature sensors embedded in the PCB ('board sensors') and separated from active dies typically have a long and steady thermal transient response. The thermal signal provided by board sensors is not subject to large transient cycles, therefore is useful for thermal control at a device scale. However, board sensors typically take real estate on the PCB layout. For example, a board sensor may use a specifically designed area in the mother board of a device. According to embodiments disclosed herein, it is desirable to avoid usage of real state in the PCB for maintenance and control operations, which is desirable in the context of device miniaturization. To increase availability of real estate in the PCB, embodiments disclosed herein include temperature sensors embedded in functional dies in the PCB, thus saving real estate on the mother board of the device. A temperature sensor ('die sensor') may be very dynamic and do not offer a very stable thermal signal to be used for thermal control.

Figure 1:
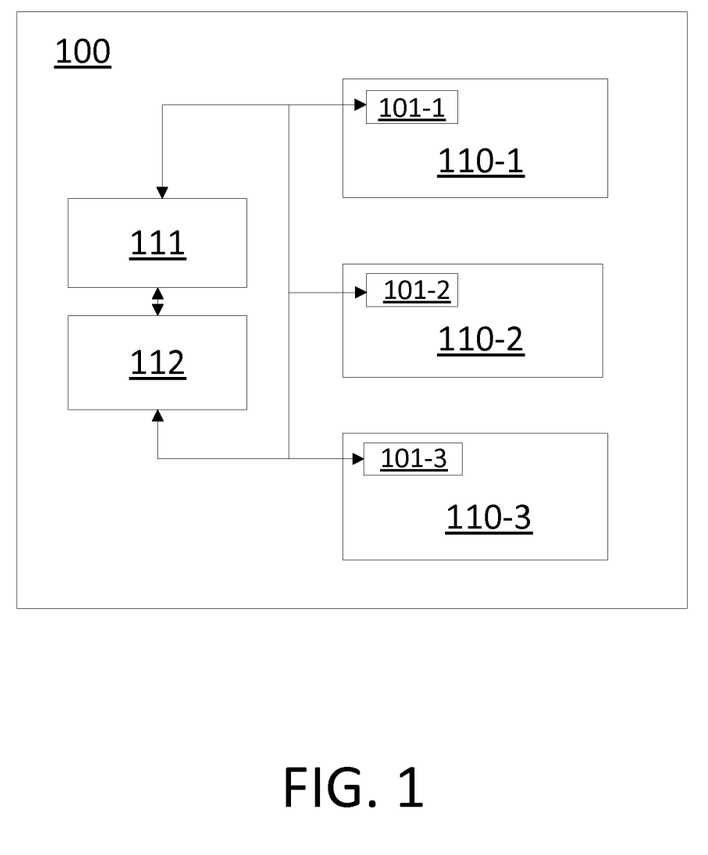
FIG. 1 illustrates a printed circuit board (PCB) configured for thermal control of a portable electronic device, according to some embodiments.

FIG. 1 illustrates a printed circuit board (PCB) 100 configured for thermal control of a portable electronic device, according to some embodiments. PCB 100 may include dies 110-1, 110-2, and 110-3, each corresponding to an integrated circuit (IC) having a specific application (hereinafter collectively referred to as dies 110). Accordingly, dies 110 may correspond to application specific ICs (ASICs). In some embodiments, dies 110 may include RF Power Amplifiers (PAs). For example, multiple RF Pas may be used in portable electronic devices to handle multiple RF antennas. The number of dies 110 included in PCB 100 is not limiting of embodiments consistent with the present disclosure. While FIG. 1 shows three dies 110-1, 110-2, and 110-3, any number of dies may be included in PCB 100, according to embodiments consistent with the present disclosure. Also shown in FIG. 1 is temperature sensor 101-1 included in die 110-1, temperature sensor 101-2 included in die 110-2, and temperature sensor 101-3 included in die 110-3. Hereinafter, temperature sensors 101-1, 101-2, and 101-3 will be collectively referred to as temperature sensors 101.

Temperature sensors 101 may be any type of electronic circuit configured to measure temperature, such as a thermistor. In some embodiments, temperature sensor 101 may include a thermocouple, or any other temperature sensing circuit. FIG. 1 also includes a processor circuit 111 and a memory circuit 112 within the layout of PCB 100. Processor circuit 111 and memory circuit 112 are coupled to one another, so that processor circuit 111 executes commands from code stored in memory circuit 112. Processor circuit 111 may also read data from and write data to, memory circuit 112. Processor circuit 111 and memory circuit 112 are coupled to each of temperature sensors 101. Processor circuit 111 may receive temperature values from at least one of temperature sensors 101. Furthermore, processor circuit 111 may use the temperature from temperature sensors 101 as input values for a simulation program stored in memory circuit 112. Thus, processor circuit 111 may compute a temperature gradient chart, or temperature map, of PCB layout 100.

In embodiments consistent with the present disclosure, it is desirable to have an accurate estimate of the thermal performance of the electronic device operated by circuitry in PCB 100. Accordingly, a temperature value associated to the PCB substrate may better represent the thermal flux within the portable device. During operation of the electronic device, several of the dies 110 may become active at different time intervals. During an active period, a certain die 110 may draw a large amount of power, thus dissipating a large amount of heat. The die corresponding to the active power amplifier may thus be heated to an exceedingly high temperature, not representative of the overall temperature in the rest of PCB 100. A measurement provided by a temperature sensor in such circuit may be unrealistically high, for the purposes of estimating heat flux within the portable electronic device. Thus, in some embodiments it may be desirable to use values provided by temperature sensors included in dies 110 including inactive ICs, or that typically draw a moderate to low amount of power during operation.

In some embodiments, dies 110 correspond to power amplifiers for RF antennas. For example, in a typical portable electronic device each one of dies 110-1, 110-2, and 110-3 may be a power amplifier for an RF antenna operating in a given frequency band. In that regard, during RF communication only one of dies 110 may be used regularly. In fact, in some embodiments a number of dies 110 may remain idle for most of the usable period of the portable electronic device. For example, in some embodiments the device may be regularly operated in a first geographical area where RF radiation in a first bandwidth is simply unavailable. A first power amplifier die in PCB 100 tuned for the first bandwidth may remain idle for as long as the device is operated in the first geographical area. For clarity, the first power amplifier may be referred to as "OFF Band" power amplifier. A temperature sensor included in the "OFF Band" may be used to provide temperature data.

Some embodiments such as illustrated in FIG. 1 may use temperature provided from multiple temperature sensors 101 in order to obtain a more accurate temperature gradient. For example, in some embodiments the minimum temperature value provided at any given point in time by multiple temperature sensors 101 may be used. As dies 110 may be turned 'on' and 'off' intermittently, a minimum value from a plurality of temperature sensors may be sufficiently stable. In some embodiments the average of multiple values provided by temperature sensors 101 may be used for thermal control. Further according to some embodiments, a statistical operation may be performed to the measurement values provided by multiple temperature sensors 101 across PCB 100. For example, in some embodiments the lowest measurement value may be discarded from a measurement set. Or the highest measurement value may be discarded from a measurement set. Or both the lowest and the highest values may be discarded from a measurement set. In the above embodiments, processor 111 may process and perform statistical operations with temperature data provided by temperature sensors 101. Thus, temperature sensors 101 according to the above embodiments may provide a steady thermal signal response. Furthermore, when a radio system in a portable electronic device as disclosed herein alternates from one PA to another, a temperature sensor in a third, idle PA may provide an accurate thermal response through the dynamic transition. For example, die 110-1 may be a PA operating in a first RF band and die 110-3 may be a PA operating in a third RF band. During operation of the portable electronic device, the device may alternate activation between die 110-1 and die 110-3, while PA die 110-2 remains idle. In such configuration, processor 111 may determine that a temperature reading from temperature sensor 101-2 in idle PA die 110-2 is a desirable choice.

Figure 2:
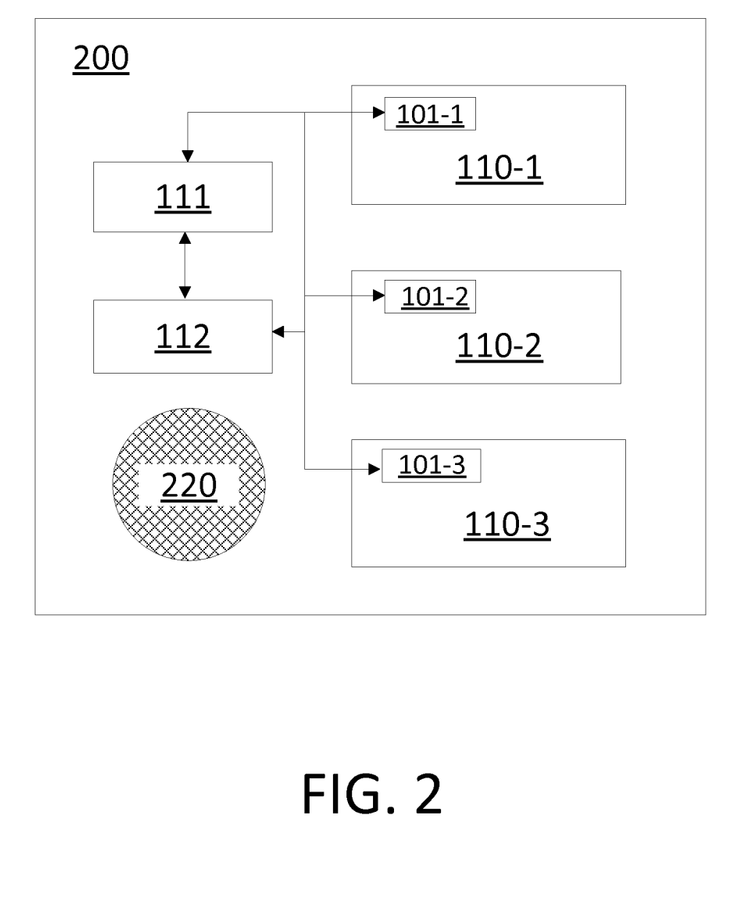
FIG. 2 illustrates a PCB configured for thermal control of a portable electronic device, according to some embodiments.

FIG. 2 illustrates a PCB 200 configured for thermal control of a portable electronic device, according to some embodiments. PCB 200 includes dies 110, temperature sensors 101, processor circuit 111, and memory circuit 112, described in detail above (cf. FIG. 1). PCB 200 in FIG. 2 also includes a thermal component 220 that may be a 'hot spot' in PCB 200. For example, thermal component 220 may be a battery in a handheld electronic device. In that regard, thermal component 220 may be a constant heat source due to extended periods of operation. A constant heat source may be an element in PCB 200 that is at a higher temperature than its surroundings for an extended period of time, relative to the period of time during which the electronic device is operating. Thermal component 220 may be coupled to PCB 200, but not inside PCB 200, nor embedded in PCB 200. Thus, to have an accurate description of a thermal gradient distribution across PCB 200, it may be desirable to place a temperature sensor 101 in a die 110 proximal to thermal component 220. Further according to some embodiments thermal component 220 may be a heat sink that remains at a lower temperature relative to other components in PCB 200. For example, thermal component 220 may be a glass forming part of a window of the portable electronic device.

In embodiments consistent with the present disclosure, processor circuit 111 may determine that die 110-3 is closest to thermal component 220. And processor circuit 111 may determine that die 110-1 is farthest to thermal component 220. In such configuration, processor circuit 111 may select measurements from temperature sensors 101-1 and 101-3. Moreover, in some embodiments processor circuit 111 may average the measurements from temperature sensors 101-1 and 101-3. Further according to some embodiments, processor circuit 111 may select the lowest value from the measurements provided by temperature sensors 101-1 and 101-3.

Figure 3:
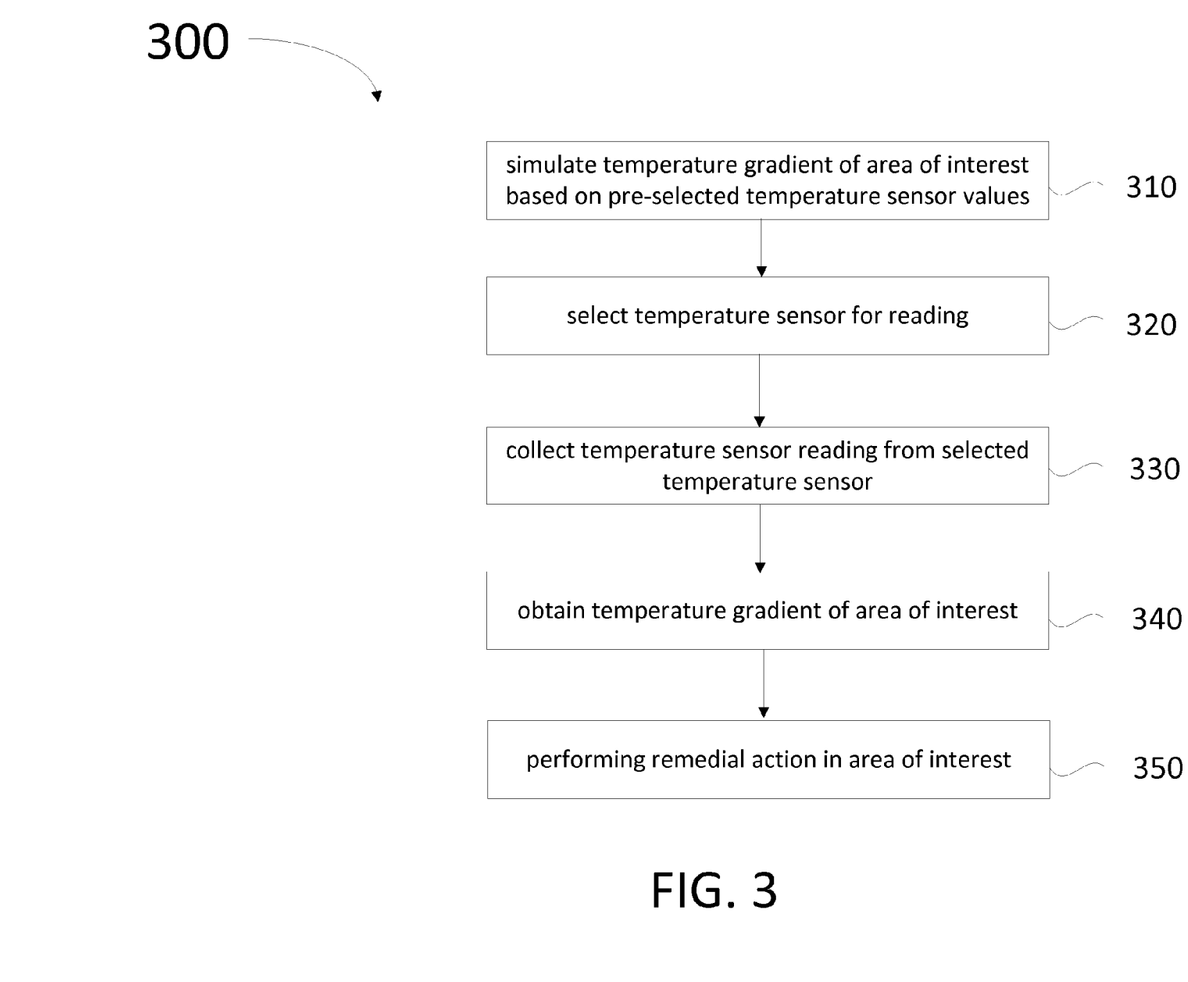
FIG. 3 illustrates a flow chart in a method for thermal control of a portable electronic device, according to some embodiments.

FIG. 3 illustrates a flow chart in a method 300 for thermal control of a portable electronic device, according to some embodiments. A portable electronic device in method 300 may include a PCB layout having dies, each die including a temperature sensor (e.g., PCB 100, dies 110, and temperature sensors 101, cf. FIG. 1). Furthermore, the PCB layout in method 300 may include a processor circuit and a memory circuit (e.g., processor circuit 111 and memory circuit 112, cf. FIG. 1). Accordingly, steps in method 300 may be partially or completely performed by the processor circuit executing commands, storing data, and using data stored in the memory circuit.

Step 310 includes simulating a temperature gradient of an area of interest in the PCB based on pre-selected temperature sensor values. Step 310 may include associating each of a plurality of points in the PCB layout with a temperature value. Accordingly, step 310 may be performed using a computer aided design (CAD) program, using a set of pre-existing measured data, or a combination of both. The CAD program may be stored in the memory circuit and executed by the processor circuit in the PCB layout. In some embodiments, the CAD program may be stored in a memory circuit and executed by a processor circuit not included in the PCB layout. In such embodiments, the thermal gradient model resulting from step 310 may be stored in the memory circuit in the PCB layout Step 320 includes selecting a temperature sensor for a temperature reading. Accordingly, step 320 may include selecting a temperature sensor in an idle die of the PCB layout. Furthermore, step 320 may include selecting a temperature sensor from a plurality of temperature sensors. As discussed above in relation to FIGS. 1 and 2, step 320 may include selecting a temperature sensor located proximal to an thermal component in the PCB layout. For example, step 320 may include selecting a temperature sensor located proximal to a heat source in the PCB layout, or in the electronic device. In some embodiments step 320 may include a temperature sensor located distal from an a thermal component. The thermal component in step 320 may be a heat sink, in some embodiments.

Step 330 includes collecting temperature sensor readings from the selected temperature sensor. Step 330 may include storing at least a sensor reading in the memory circuit. Step 340 includes obtaining a temperature gradient of the area of interest. Accordingly, step 340 may include using the temperature sensor reading in the temperature gradient model obtained in step 310. For example, the temperature sensor reading may be a boundary value in a temperature gradient model created in step 310. Thus, step 340 may include creating a thermal gradient or a thermal map from the boundary value provided to the thermal gradient model.

Step 350 includes performing a remedial action in the area of interest based on the temperature gradient obtained. In some embodiments, step 350 may include turning 'off' an integrated Circuit (IC) embedded in the PCB. Further according to some embodiments, step 350 may include performing a remedial action in the area of interest comprises setting an IC in 'sleep' mode.

Figure 4:
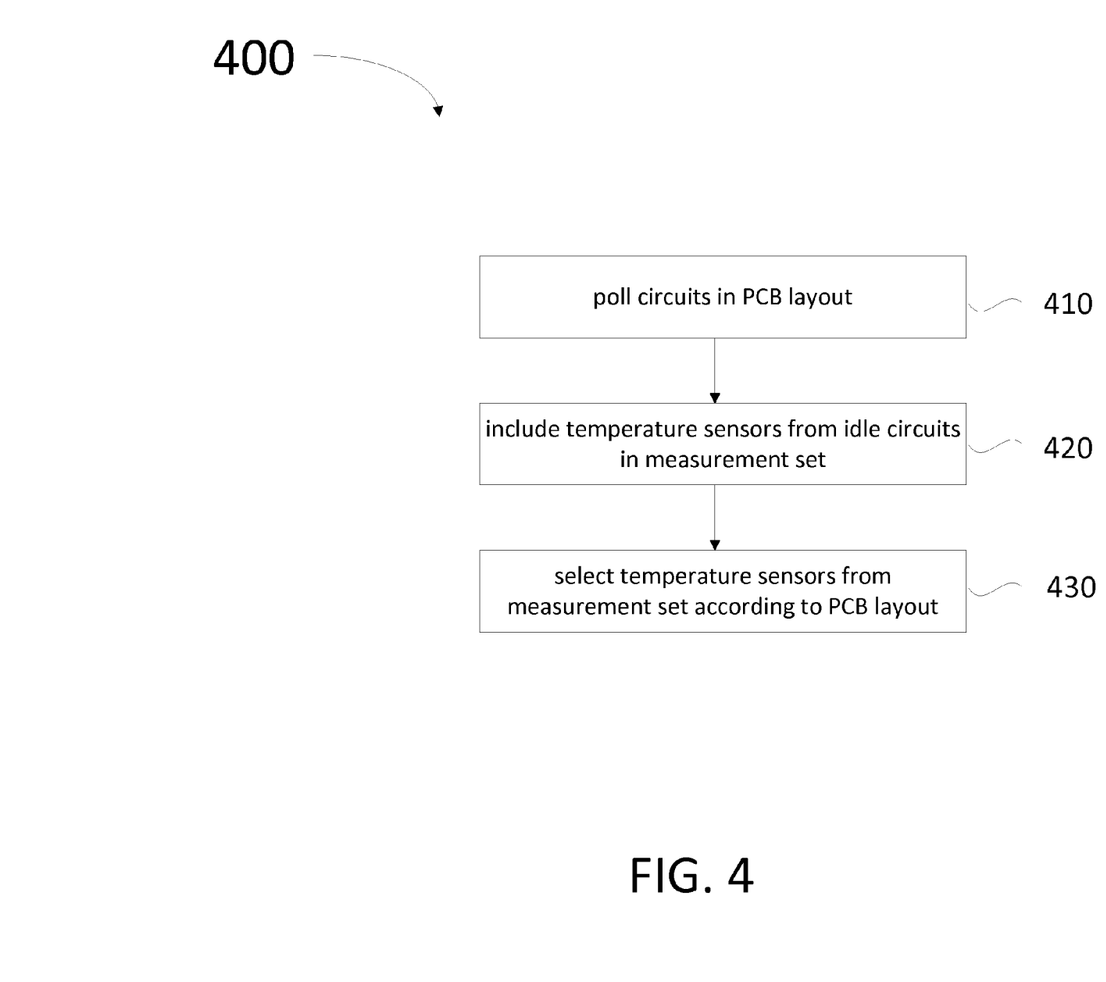
FIG. 4 illustrates a flow chart in a method for thermal control of a portable electronic device, according to some embodiments.

FIG. 4 illustrates a flow chart in a method 400 for thermal control of a portable electronic device, according to some embodiments. A portable electronic device in method 400 may include a PCB layout having dies, each die including a temperature sensor (e.g., PCB 100, dies 110, and temperature sensors 101, cf. FIG. 1). Furthermore, the PCB layout in method 400 may include a processor circuit and a memory circuit (e.g., processor circuit 111 and memory circuit 112, cf. FIG. 1). Accordingly, steps in method 300 may be partially or completely performed by the processor circuit executing commands, storing data, and using data stored in the memory circuit. In some embodiments, steps in method 400 may be performed in the context of step 320 in method 300, described in detail above (cf. FIG. 3).

Step 410 includes polling circuits in the PCB layout. Accordingly, step 410 may include querying for each IC in the PCB layout whether the circuit is active or idle. When the circuit is active, step 410 may skip the temperature sensor included in the die for the circuit. Thus, data measured by temperature sensors located in dies with active ICs may not be collected. Step 420 may include forming a measurement set having temperature sensors from idle circuits, as determined in step 410. Accordingly, step 420 may include forming a measurement set including one element, e.g., a PA for an OFF Band antenna (cf. the detailed description of FIG. 1). In some circumstances the measurement set formed in step 420 may include multiple temperature sensors. Further according to some embodiments, when no IC in the PCB layout is idle (which may be a rare occurrence), step 420 may include adding temperature sensors from the least active dies to the measurement set. Step 430 includes selecting temperature sensors from the measurement set according to the PCB layout. For example, step 420 may include determining which circuits in the measurement set are proximal to a thermal component such as a heat source or a heat sink (e.g., thermal component 220, cf. FIG. 2).

Figure 5:
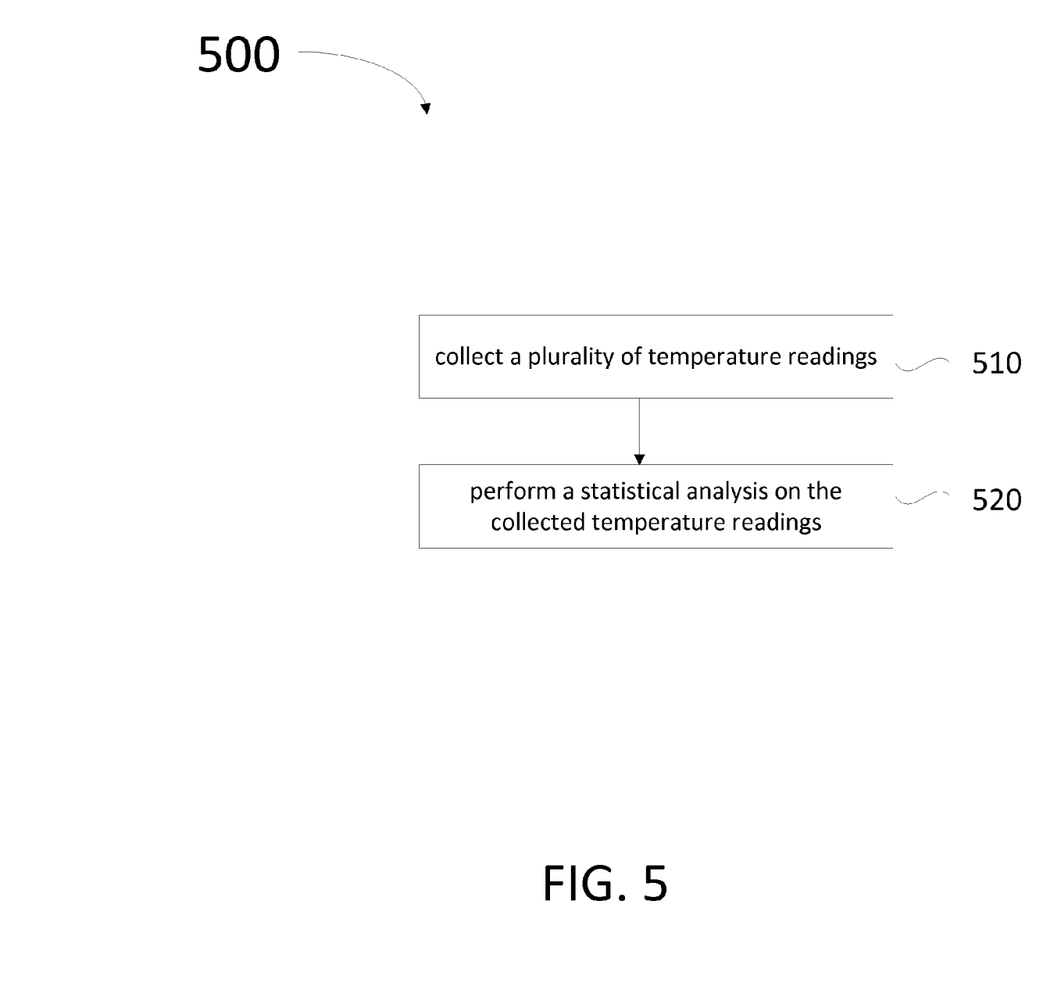
FIG. 5 illustrates a flow chart in a method for thermal control of a portable electronic device, according to some embodiments.

FIG. 5 illustrates a flow chart in a method 500 for thermal control of a portable electronic device, according to some embodiments. A portable electronic device in method 500 may include a PCB layout having dies, each die including a temperature sensor (e.g., PCB 100, dies 110, and temperature sensors 101, cf. FIG. 1). Furthermore, the PCB layout in method 500 may include a processor circuit and a memory circuit (e.g., processor circuit 111 and memory circuit 112, cf. FIG. 1). Accordingly, steps in method 300 may be partially or completely performed by the processor circuit executing commands, storing data, and using data stored in the memory circuit. In some embodiments, steps in method 400 may be performed in the context of step 330 in method 300, described in detail above (cf. FIG. 3).

Step 510 includes collecting a plurality of temperature readings. Step 510 may include collecting a plurality of temperature readings spread through a period of time. In some embodiments, step 510 may include collecting a plurality of temperature readings from different temperature sensors located in different areas of the PCB layout. Further according to some embodiments, step 510 may include temperature readings from different areas of the PCB layout, and spread through a period of time. In some embodiments, step 510 may include removing certain values from the temperature readings. For example, the maximum temperature reading and the minimum temperature reading in the plurality of temperature readings may be removed.

Step 520 includes performing a statistical analysis on the collected temperature readings. Accordingly, step 520 may include forming a histogram of temperature values. Step 520 may further include finding a mean, a median, a maximum, a minimum, and a standard deviation from a distribution of measurement values as collected in step 510.

Figure 6:
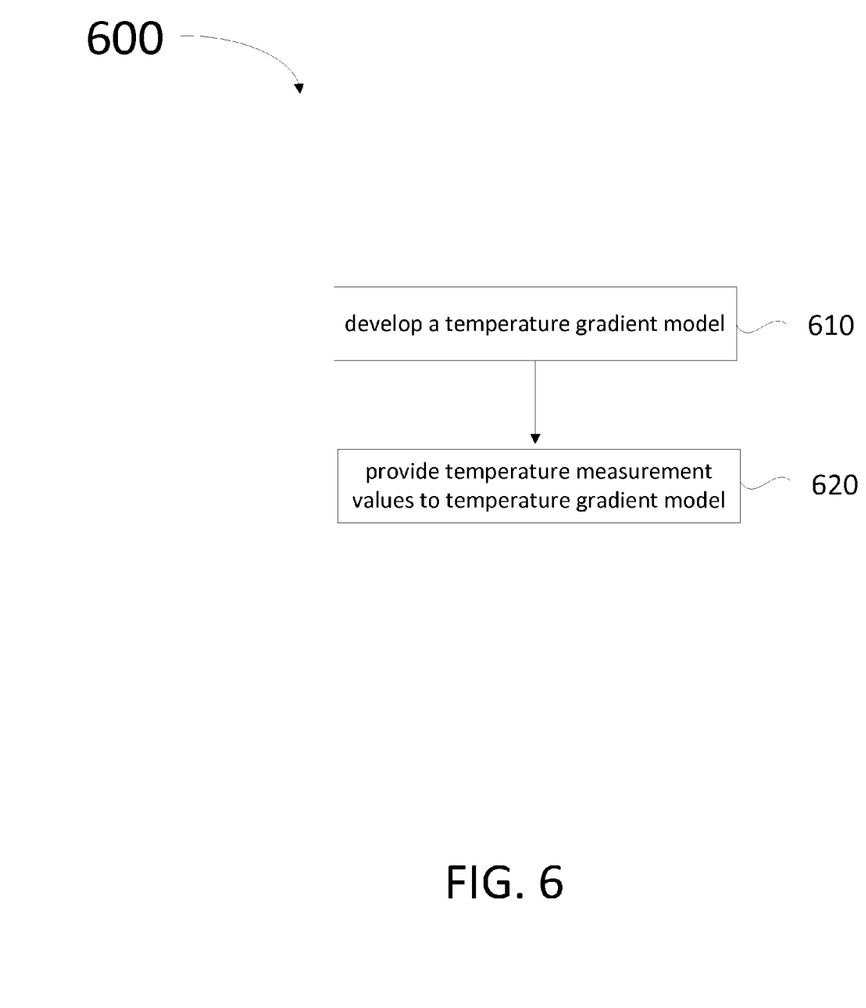
FIG. 6 illustrates a flow chart in a method for thermal control of a portable electronic device, according to some embodiments.

FIG. 6 illustrates a flow chart in a method 600 for thermal control of a portable electronic device, according to some embodiments. A portable electronic device in method 600 may include a PCB layout having dies, each die including a temperature sensor (e.g., PCB 100, dies 110, and temperature sensors 101, cf. FIG. 1). Furthermore, the PCB layout in method 600 may include a processor circuit and a memory circuit (e.g., processor circuit 111 and memory circuit 112, cf. FIG. 1). Accordingly, steps in method 300 may be partially or completely performed by the processor circuit executing commands, storing data, and using data stored in the memory circuit. In some embodiments, steps in method 600 may be performed in the context of step 340 in method 300, described in detail above (cf. FIG. 3).

Step 610 includes developing a temperature gradient model. Accordingly, step 610 may include retrieving a temperature gradient model as created in method 300 (cf. step 310, FIG. 3). Step 620 includes providing temperature measurement values to the temperature gradient model. Accordingly, step 620 may include determining a temperature gradient measurement. For example, the temperature measurement values may include a plurality of measurement values in a boundary value portion of the PCB layout. The temperature gradient model developed in step 610 may then provide temperature values in a portion of the PCB layout contained by the boundary value portion.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A Printed Circuit Board (PCB) in communication with a processor circuit and configured to determine a representative temperature of the PCB, the PCB comprising:
    a first temperature sensor embedded within a first integrated circuit (IC) directly measuring a first temperature of the first integrated circuit (IC);
    a second temperature sensor embedded within a second integrated circuit (IC) directly measuring a second temperature of the second IC;
    a component; and
    wherein the processor circuit is configured to:
        receive the first temperature and the second temperature,
        run a simulation program stored on a memory circuit to establish a temperature gradient, based upon the first temperature and the second temperature, across the PCB, and
        perform a remedial action to the component based upon the temperature gradient.

2. The PCB as recited in claim 1, wherein the remedial action comprises deactivating the component to define a sleep mode of the component.

3. The PCB as recited in claim 1, wherein the processor circuit, the memory circuit, first IC, and the second IC are disposed on the PCB.

4. The PCB as recited in claim 3, further comprising:
    a third temperature sensor embedded within a third integrated circuit (IC) directly measuring a third temperature of the third IC disposed on the PCB, wherein the processor circuit is configured to run the simulation program stored on the memory circuit to establish the temperature gradient based upon the first temperature, the second temperature, and the third temperature.

5. The PCB as recited in claim 4, wherein at least one of the first IC, the second IC, or the third IC comprises a power amplifier used for a radio frequency antenna.

6. The PCB as recited in claim 5, wherein when the processor circuit runs the simulation program to establish the temperature gradient, the processor circuit does not use a temperature from one or more inactive integrated circuits.

7. The PCB as recited in claim 6, wherein the component comprises a battery.

8. A portable electronic device configured to perform a remedial action in response to a thermal flux within the portable electronic device, the portable electronic device comprising:
- a printed circuit board (PCB);
- a temperature sensor embedded within an IC disposed on the PCB and that directly measures a temperature of the first IC;
- a processor circuit that receives multiple temperature readings of the PCB from the temperature sensor embedded within the IC to establish a simulated temperature gradient across the PCB based upon the multiple temperature readings;
- a memory circuit that sends to the processor circuit a simulation program to establish the simulated temperature gradient; and
- a component disposed on the PCB, the component receiving the remedial action based upon the simulated temperature gradient.

9. The portable electronic device as recited in claim 8, further comprising:
- a second temperature sensor embedded in a second IC disposed on the PCB;
- a third temperature sensor embedded in a third IC disposed on the PCB; and
- wherein the multiple temperature readings are determined by the temperature sensor, the second temperature sensor, and the third temperature sensor.

10. The portable electronic device as recited in claim 8, wherein the processor circuit processes a statistical operation of the multiple temperature readings to determine the simulated temperature gradient.

11. The portable electronic device as recited in claim 10, wherein the statistical operation comprises an average of the multiple temperature readings only from a first temperature sensor and a third temperature sensor.

12. The portable electronic device as recited in claim 11, wherein the first temperature sensor is closer to the component than the second temperature sensor and the third temperature sensor.

\* \* \* \* \*